(No Model.)
T. J. MANN.
HARROW.
No. 493,507. Patented Mar. 14, 1893.
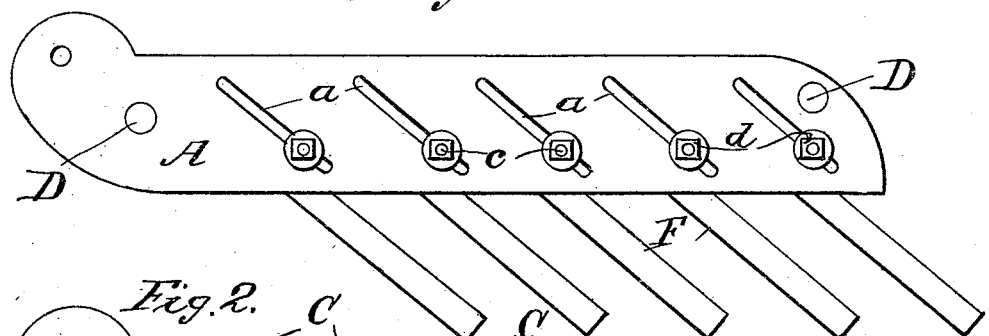
Fig. 1.
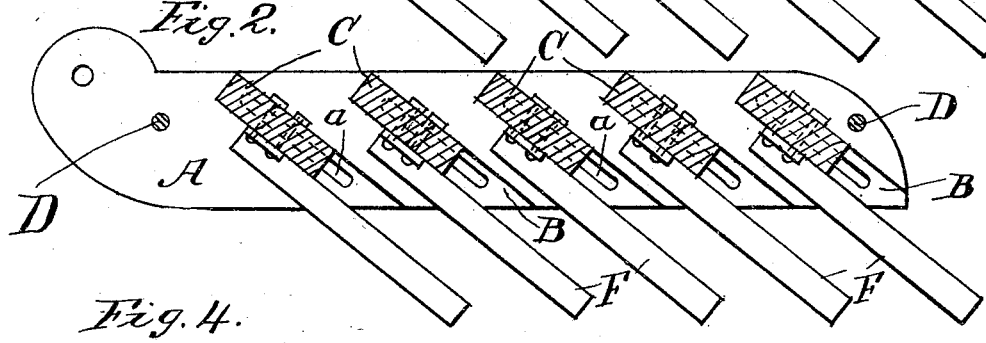
Fig. 2.
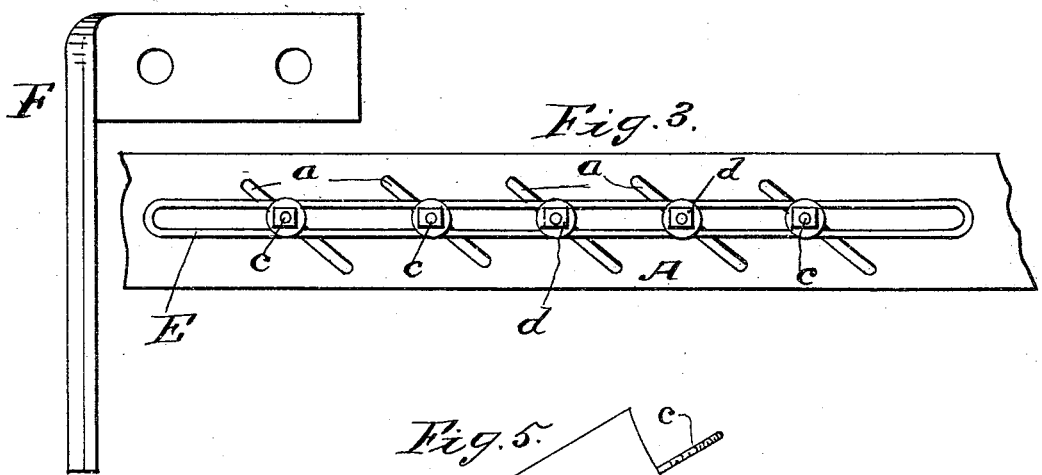
Fig. 4.
Fig. 3.
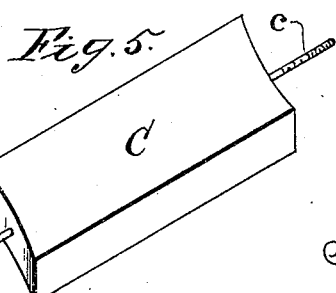
Fig. 5.
WITNESSES:
H. J. Doyle
A. L. Watson
INVENTOR
Thomas J. Mann
BY C. T. Belt
ATTORNEY.
THE NORRIS PETERS CO., PHOTO-LITHO., WASHINGTON, D. C.

United States Patent Office.

THOMAS J. MANN, OF MIXIE, TENNESSEE.

HARROW.

SPECIFICATION forming part of Letters Patent No. 493,507, dated March 14, 1893.

Application filed September 23, 1892. Serial No. 446,728. (No model.)

*To all whom it may concern:*

Be it known that I, THOMAS J. MANN, a citizen of the United States, residing at Mixie, in the county of Carroll and State of Tennessee, have invented certain new and useful Improvements in Harrows, of which the following is a specification.

This invention relates to harrows, and its novelty will be fully understood from the following description and claims when taken in connection with the annexed drawings; and the object of the invention is to provide a harrow of great strength and durability.

A further object of the invention is to provide a harrow with adjustable cross ribs or strips, to which are secured a series of harrow teeth.

A still further object of the invention is to provide means for adjusting the said strips simultaneously.

In the accompanying drawings forming part of this invention, Figure 1 is a side view of my harrow, with the ribs or strips adjusted or lowered for hard ground. Fig. 2 is a longitudinal section, showing the said ribs raised to work soft ground or to make a shallow cut. Fig. 3 is a modified form of adjustment. Fig. 4 is a detached front view of one of the teeth. Fig. 5 is a perspective of one of the ribs.

The same letters of reference denote the same parts throughout the several figures.

The main frame consists of two parallel beams A, having slots or openings $a$, and upon their inner sides enlarged recesses B, around said slots; the recesses and slots in each beam being opposite each other, and the said beams being held together by a brace rod D.

C represents the cross ribs or strips, the ends of which are concaved, so that there will be as little friction as possible between said ends and the recesses B, when the ribs are adjusted up and down therein. These concave ends are provided with screw spindles $c$, which extend through the slots $a$ on either side of the beams A, and are provided with nuts $d$.

E, denotes the adjusting device, and consists of two parallel rods joined together at their ends, forming a link, the opening in which receives the ends of the screw spindles $c$, and by moving the said link up and down it carries with it the cross ribs C, which are held in any position according to the depth of cut desired, by screwing the nuts $d$, on the link.

F, refers to a series of L shaped teeth, secured to each cross rib C, so that when said ribs are moved as hereinbefore described, the teeth are adjusted.

It will be observed that by loosening the nuts $d$, and moving the adjusting link the cross ribs are all moved together, and when the link is not used, the ribs may be adjusted separately to different positions.

Having thus described my invention, what I claim as new, and desire to secure by Letters Patent, is—

1. In a harrow, the combination of the beams A, having apertures extending clear through them and a recess surrounding each of said apertures upon the inner side of the said beams, with the cross ribs C adjustably secured between the said beams and adapted to be moved on an incline in the said recesses, the brace rods securing the beams together, and the teeth secured to the cross ribs, substantially as shown and described.

2. In a harrow, the combination of the beams A, having a series of apertures, and a series of recesses, with the cross ribs C having concave ends which fit in said recesses, the L shaped teeth rigidly secured to the said ribs, and means such as shown and described for adjusting the cross ribs simultaneously, for the purpose set forth.

3. In a harrow, the combination of the cross ribs having concave ends, and the L shaped teeth secured between said ends, with the adjusting link E, screw spindles $c$ and nuts $d$, substantially as shown and described.

In witness whereof I hereunto set my hand in the presence of two witnesses.

THOMAS J. MANN.

Witnesses:
W. H. SARTOR,
G. W. HUMBLE.